United States Patent
Park et al.

(10) Patent No.: US 6,842,756 B2
(45) Date of Patent: Jan. 11, 2005

(54) METHOD FOR ELIMINATING STATE OBJECTS IN JAVA TRANSACTION SERVICE USING OBJECT TRANSACTION SERVICE COORDINATOR

(75) Inventors: Nam Shik Park, Taejon (KR); Han Namgoong, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 449 days.

(21) Appl. No.: 10/125,457

(22) Filed: Apr. 19, 2002

(65) Prior Publication Data

US 2003/0033309 A1 Feb. 13, 2003

(30) Foreign Application Priority Data

Aug. 7, 2001 (KR) .......................................... 2001-47559

(51) Int. Cl.[7] .............................................. G06F 17/30
(52) U.S. Cl. ........................ 707/10; 707/100; 707/102
(58) Field of Search .................... 707/1–10, 100–104.1; 709/203, 223; 717/100, 174, 108

(56) References Cited

U.S. PATENT DOCUMENTS

| 5,920,725 A | * | 7/1999 | Ma et al. ..................... 717/171 |
| 2003/0004955 A1 | * | 1/2003 | Cedola et al. ............... 707/100 |

FOREIGN PATENT DOCUMENTS

| KR | 1997-56252 | 7/1997 | ........... H04L/12/56 |
| KR | 1997-66882 | 10/1997 | ........... G96F/12/00 |
| KR | 1998-45891 | 9/1998 | ........... H04B/1/59 |
| KR | 1998-50963 | 9/1998 | ........... G06F/15/16 |
| KR | 1999-77444 | 10/1999 | ........... G06F/15/16 |

* cited by examiner

*Primary Examiner*—Charles Rones
*Assistant Examiner*—Neveen Abel-Jalil
(74) *Attorney, Agent, or Firm*—Piper Rudnick LLP

(57) ABSTRACT

A method for eliminating state objects by using an object transaction service coordinator is disclosed. The method provides the state object delete unit and the state object delete adapter in the java transaction service. At the completion step of an object transaction, the state object delete unit in the state object delete adapter deletes a transaction state manager and objects, which are excessively occupied a memory for improving the repeatedly performed object transactions.

6 Claims, 3 Drawing Sheets

METHOD FOR ELIMINATING STATE OBJECTS IN JAVA TRANSACTION SERVICE USING OBJECT TRANSACTION SERVICE COORDINATOR

FIELD OF THE INVENTION

The present invention relates to a method of an object transaction service (OTS); and, more particularly, to a method for eliminating a state object in a java transaction service (JTS) using an object transaction service coordinator and computer readable recording medium for executing the same method.

DESCRIPTION OF RELATED ARTS

Generally, a transaction processing application program is written by using procedures and is implemented by using a client-server model, which is a widely known transaction processing implementation model for distributing transaction processing. For improving a transaction service and supporting the client-server model, a transaction processing monitor is commonly used in a transaction processing. However, since the conventional transaction processing application program is hard to be reused and dependent on the transaction processing monitor, there are some problems in change of platforms and cooperation with other transaction processing monitors.

A procedure type transaction processing application has been improved to an object oriented type transaction processing application due to above-mentioned difficulties. In the object oriented type transaction processing application, an object transaction service or a java transaction service can be employed as the transaction processing monitor. The java transaction service is implemented by using the object transaction service as a base layer. The object oriented type transaction processing applications generally perform transactions repeatedly and store a state of an object accumulatively in a certain location of a memory. By repeatedly performing the transactions, accumulated state objects excessively occupy a memory space. The accumulated state objects may cause lack of a memory space and the memory space used for a java object cannot be directly managed due to characteristics of java programming language. Therefore, it is necessary to provide a method for eliminating the state objects in the java transaction service after object transaction completion.

In other words, it is very hard to reuse a program in a conventional procedure type transaction application so that the conventional transaction application has been improved toward the object oriented transaction application. The object transaction service or the java transaction service is used for the object oriented transaction processing. The java transaction service can be implemented by using the object transaction service as a base layer. In the java transaction service, a plurality of transaction state objects may be generated during the object transaction processing. The transaction service processing is performed repeatedly and the generated transaction state objects are accumulated in a memory therefore, the memory is excessively occupied by the accumulated state objects and it causes a lack of the memory.

SUMMARY OF THE INVENTION

It is, therefore, an object of the present invention to provide a method for eliminating state objects in java transaction service after completing a transaction processing by providing a state object delete unit and a state object delete adapter.

It is, therefore, another object of the present invention to provide a computer readable recode medium for executing the method for eliminating state objects in java transaction service after completing a transaction processing.

In accordance with an aspect of the present invention, there is provided a method for eliminating state objects of a java transaction service by using an object transaction service coordinator, including steps of: a) allowing a java transaction service unit to include a state object delete unit and a state object delete adapter when a transaction manager of the java transaction service generates a transaction state manager object and registering the state object delete adapter in which the state object delete unit is registered, to a coordinator of an object transaction service unit as a synchronization object; b) requesting an after_completion process, which is a synchronization process after completing a transaction, to synchronization objects registered after the coordinator completes a process of a commit protocol at completing the transaction, and driving the state object delete adapter for invoking the synchronization object to perform the after_completion process; and c) driving the state object delete unit invoked by the stat object delete adapter and deleting a transaction state manager registered to the transaction manager of the java transaction service unit and objects which are managed by the transaction state manager.

In accordance with another aspect of the present invention, there is also provided a computer readable record medium for executing the method of deleting state objects, including functions of: a) allowing a java transaction service unit to include a state object delete unit and a state object delete adapter when a transaction manager of the java transaction service generates a transaction state manager object and registering the state object delete adapter in which the state object delete unit is registered, to a coordinator of an object transaction service unit as a synchronization object; b) requesting an after_completion process, which is a synchronization process after completing a transaction, to synchronization objects registered after the coordinator completes a process of a commit protocol at completing the transaction, and driving the state object delete adapter for invoking the synchronization object to perform the after_completion process; and c) driving the state object delete unit invoked by the stat object delete adapter and deleting a transaction state manager registered to the transaction manager of the java transaction service unit and objects which are managed by the transaction state manager.

A java transaction service is employed by using an object transaction service as a base. Plurality of state object managers and objects, which are managed by the state object manager, are generated and accumulated in a memory for an object transaction processing in the java transaction service. A java transaction application program performs repeatedly the transaction processing. The state objects of the completed transactions may be excessively accumulated in the java transaction service and it may cause a lack of a memory.

Since a characteristic of a java programming language, the memory, which is occupied by the java object, cannot be managed directly. For improving such a problem of the java transaction service, the present invention provides the state object delete unit and the state object delete adapter in the java transaction service. At the completion step of an object transaction processing, a coordinator of an object transaction service completes a commit protocol composing of two steps and then an after_completion process, which is a synchronization process after a transaction is completed, is requested to synchronization objects registered in the coordinator. By the request, the state object delete unit registered in the state object delete adapter deletes a transaction state manager and objects, which are managed by the transaction state manager.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE INVENTION

Other objects and aspects of the invention will become apparent from the following description of the embodiments with reference to the accompanying drawings, which is set forth hereinafter.

Figure 1:
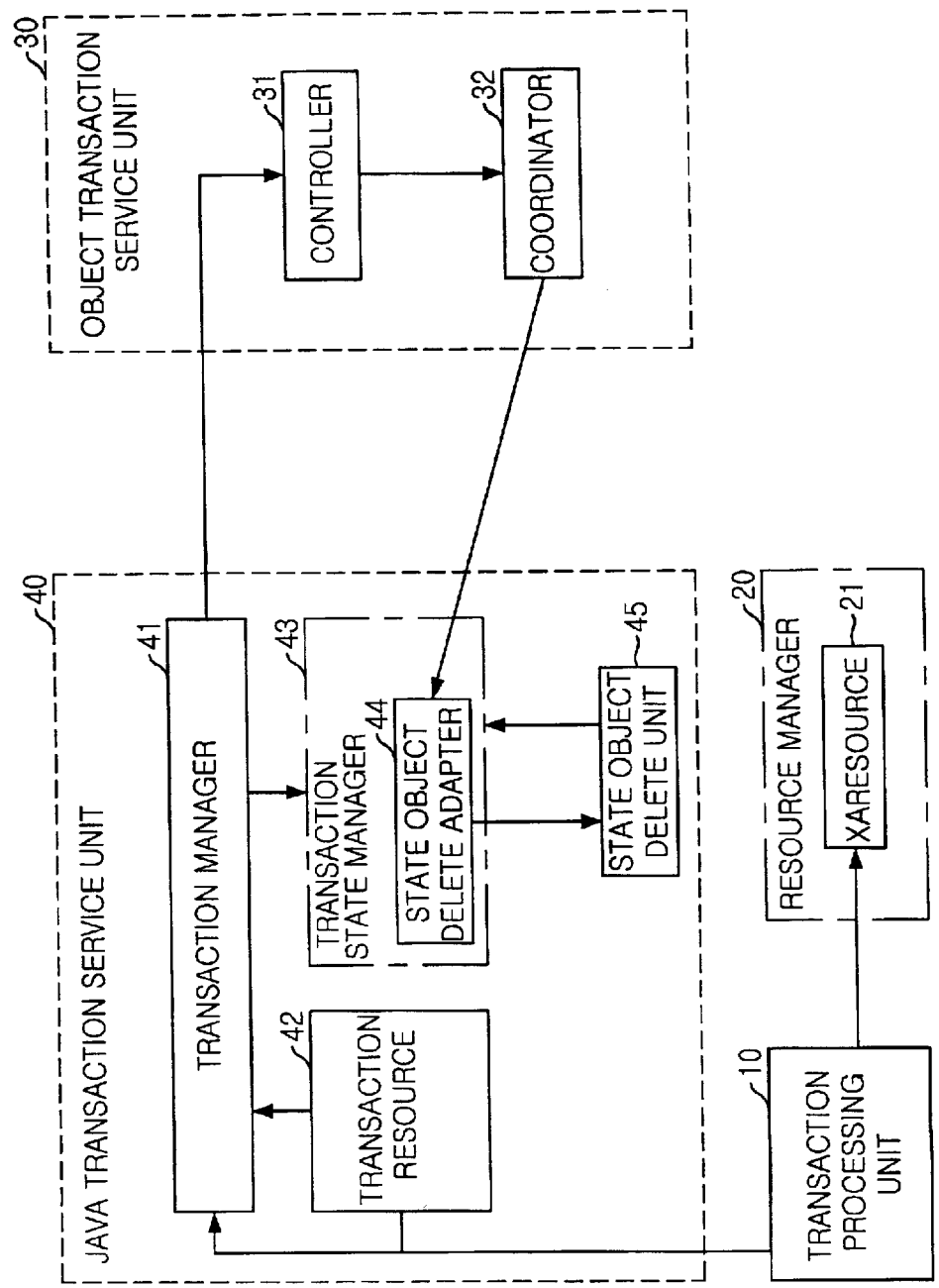
FIG. 1 is a diagram for illustrating a java transaction service system in accordance with the preferred embodiment of the present invention.

FIG. 1 is a diagram for illustrating a java transaction service system in accordance with the preferred embodiment of the present invention.

Referring to FIG. 1, the java transaction service includes a transaction processing unit (TPU) 10, a resource manager (RM) 20, an object transaction service unit (OTSU) 30 for providing an object transaction service and a java transaction service unit (JTSU) 40 for providing a java transaction service.

The resource manager (RM) 20 provides an object, XAResource 21.

The object transaction service (OTS) 30 is composed of a controller 31 and a coordinator 32.

The java transaction service unit (JTSU) 40 provides a service for object transaction processing of the transaction processing unit (TPU) 10 and is composed of a transaction manager (TM) 41, a transaction resource (TR) 42, a transaction state manager (TSM) 43, a state object delete unit (SDU) 45 and a state object delete adapter (SDA) 44. For deleting state objects, the state object delete unit (SDU) 45 and the state object delete adapter (SDA) 44 are provided in the java transaction manager (JTM) 43. The state object delete adapter (SDA) 44 is driven by the coordinator 32 in a completion step of a transaction processing and after completing two steps transaction commit protocol. The state object delete adapter (SDA) 44 invokes the state object delete unit (SDU) 45 to deletes the transaction state object manager (TSM) 43 in the java transaction service unit (JTSU) 40 and state objects, which are managed by the transaction state object manager (TSM) 43.

The transaction processing unit (TPU) 10 is a program written by the resource manager (RM) 20 and the java transaction service unit (JTSU) 40 for processing the object transaction. The transaction processing unit (TPU) 10 receives a reference of an object of the transaction manager (TM) 41 in the java transaction service unit (JTSU) 40 and XAResource 21 of the resource manager (RM) 20 at initialization step. After receiving the reference of the object of transaction manager (TM) 41, the transaction processing unit (TPU) 10 requests to start a transaction processing to the transaction manager (TM) 41.

After receiving the request from the transaction processing unit (TPU) 10, the transaction manager (TM) 41 requests to generate objects of the controller 31 and objects of the coordinator 32 to the object service transaction service unit (OSTU) 30. A reference of the object of the controller 31 is returned back to the transaction manager (TM) 41 and the transaction manager (TM) 41 completes a process for starting the transaction by storing the reference of the control object.

After completing the process for starting the transaction service, the transaction processing unit (TPU) 10 requests to generate the transaction resource (TR) 42 to the transaction manager (TM) 41 and receives a reference of the transaction resource (TR) 42. The transaction processing unit (TPU) 10 requests to register or to cancel the registration of the received XAResource 21 to the transaction resource (TR) 42.

If the transaction processing unit (TPU) 10 requests to register the XAResource 21, then the transaction resource (TR) 42 registers the state object delete adapter (SDA) 44 including the state object delete unit (SDU) 45 onto the coordinator 32. Detailed explanation of the above-mentioned process will be described in later paragraph with reference to FIG. 2.

After registering the XAResource 21, the transaction processing unit (TPU) 10 performs a defined transaction. After completing the defined transaction, the transaction processing unit (TPU) 10 cancels registering the XAResource 21 and requests completing the transaction service to the transaction manager (TM) 41.

The transaction manager (TM) 41 requests to the object transaction service unit (OTS) 30 for completing the object transaction service after receiving the request from the transaction processing unit (TPU) 10. The coordinator 32 of the object transaction service unit (OSTU) 30 requests completing a commit process composing of two steps, preparing step and committing step, to participants of the object transaction processing. After completing the commit process, state objects are eliminated by starting a synchronization process "after_completion", which is provided by the state object delete adapter (SDA) 44.

Figure 2:
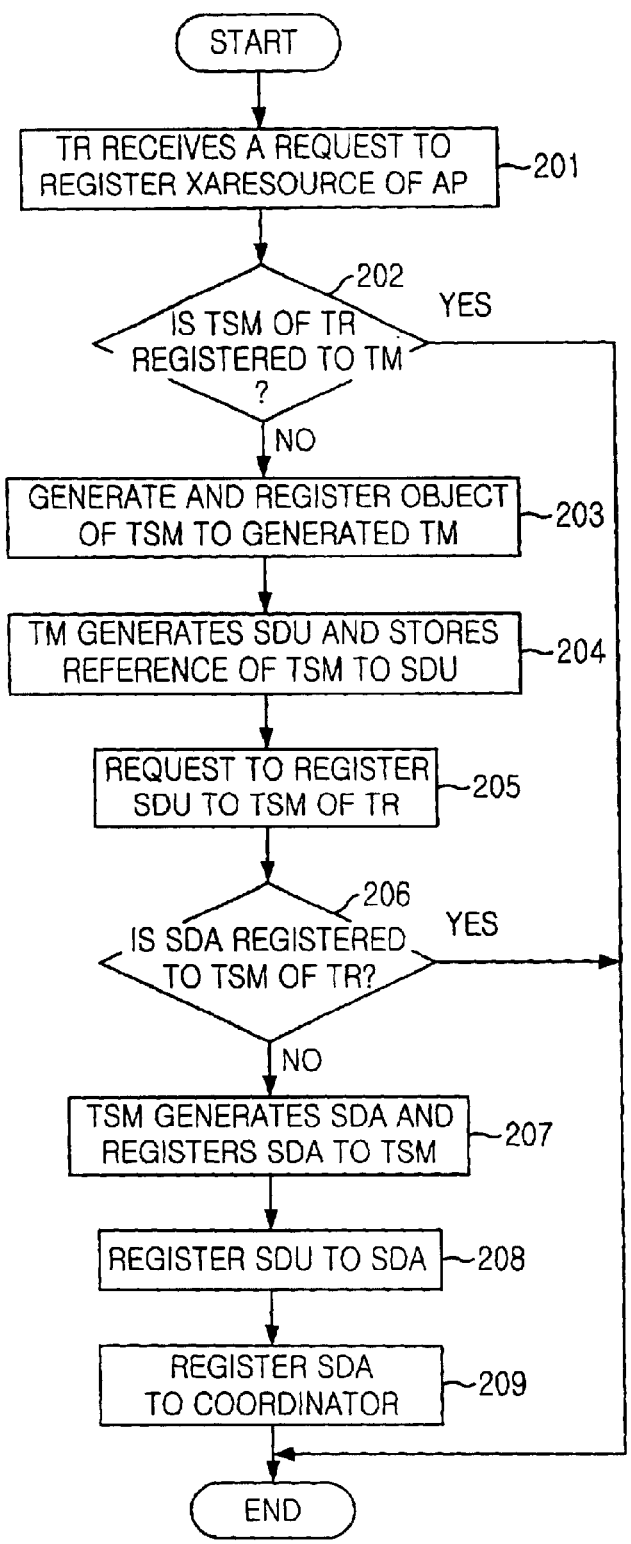
FIG. 2 is a flow chart illustrating preparation procedure in a state object delete unit for eliminating state objects in the java transaction service after completion of an object transaction in accordance with the present invention.

FIG. 2 is a flow chart illustrating preparation procedure of a state object delete unit for eliminating state objects of a java transaction service after completing an object transaction in accordance with the preferred embodiment of the present invention. Referring to FIG. 2, it is illustrated a procedure for registering a state object delete adapter (SDA) 44 to a coordinator 32 by a state object delete unit (SDU) 45 when a transaction resource (TR) 42 receives a request to register a XAResource 21 from an transaction processing unit (TPU) 10.

At first, the transaction resource (TR) 42 receives a request to register the XAResource 21 at step 201 and determines whether a transaction manager (TSM) 43 of the transaction resource (TR) 42 is registered at the transaction manager (TM) 41 at step 202.

If the transaction state manager (TSM) 43 is not registered in the transaction manager (TM) 41, then the transaction state manager (TSM) 43 is generated and registered in the transaction manager (TM) 41 at step 203.

After registering the transaction state manager (TSM) 43, the transaction manager (TM) 41 generates a state object delete unit (SDU) 45 and stores a reference of an object of the transaction state manager (TSM) 43 at step 204. The transaction manager (TM) 41 requests to register the state object delete unit (SDU) 45 in the transaction state manager (TSM) 43 of the transaction resource (TR) 42 at step 205.

After step 205, the transaction state manager (TSM) 43 of the transaction resource (TR) 42, which receives a request to register the state object delete unit (SDU) 45, determines whether the state object delete adapter (SDA) 44 is registered at the transactions resource (TR) 42 at step 206.

If the state object delete adapter is not registered in the transaction resource (TR) 42, then the transaction state manager (TSM) 43 generates the state object delete adapter (SDA) 44 and registers a reference of an object of the state object delete adapter (SDA) 45 in the transaction state manager (STM) 43 at step 207. After registering the reference of the object of the state object delete unit (SDU) 45 in the state object delete adapter (SDA) 43 at step 208, the state object delete adapter (SDA) 44 is registered in a coordinator 32 of the object transaction service unit (OTSU) 30 at step 209. By performing the steps of 207, 208 and 209, registration of the state object delete unit (SDU) 45 in the coordinator 32 is completed and a registration process of the XAResource 21 of the transaction resource 42 is continued.

After completing the registration process of the XAResource 21 at the transaction resource (TR) 42, the transaction processing unit (TPU) 10 performs a defined transaction. After performing the defined transaction, the transaction processing unit (TPU) 10 requests to cancel the registration of XAResource 21 to the transaction resource (TR) 42 and requests to end the object transaction to transaction manager (TM) 41 after completing cancellation of the registration of XAResource 21.

The transaction manager (TM) 41 requests to end the transaction to the object transaction service (OTS) 30 and the object transaction service (OTS) 30 invokes the coordinator 32 to process a commit protocol process including a preparing step and a committing step.

The coordinator 32 invokes participants, which are registered at the coordinator 32, to process and to complete the commit protocol process.

Figure 3:
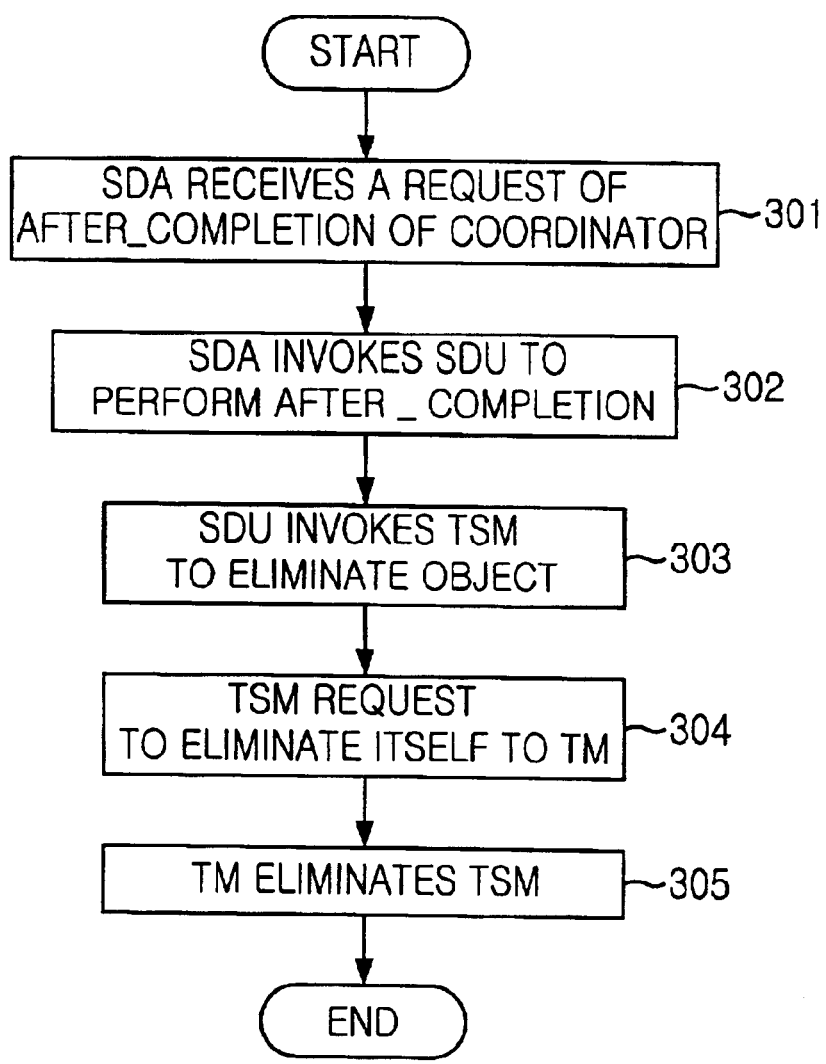
FIG. 3 is a flow chart illustrating driving steps in the state object delete unit in accordance with the present invention.

FIG. 3 is a flow-chart illustrating procedures for driving a state object delete unit. FIG. 3 shows steps of deleting objects, which are managed by a transaction state manager (TSM) 43, by processing a request of a synchronization process after completing a transaction (after_completion) of a coordinator 32.

First, the state object delete adapter (SDA) 44 of a java transaction service unit (JTSU) 40 receives a request of a synchronization process after completing a transaction (after_completion) of the coordinator 32 at step 301.

Then, the state object delete adapter (SDA) 44 invokes the state object delete unit (SDU) 45 to perform the synchronization process after completing the transaction (after_completion) at step 302.

The state object delete unit (SDU) 45 invokes the transaction state manager (TSM) 43 to delete objects at step 309.

The transaction state manager (TSM) 43 deletes objects and requests to delete the transaction state manager (TSM) 43 registered in the transaction manager (TM) 41 to the transaction manager (TM) 41 at step 304.

Finally, the transaction manager (TM) 41 deletes the transaction state manager (TSM) 43 at step 305 and the object transaction is completed.

As mentioned above, the present invention provides a method for eliminating state objects, which are generated by repeatedly performing a transaction and which cause lack of a memory problem in the java transaction service. The state objects are accumulated in the java transaction service and the accumulated state objects excessively occupy a memory space. The present invention provides the state object delete unit and the state object delete adapter in the java transaction service. At the completion step of an object transaction, a coordinator of an object transaction service completes a commit protocol composing of two steps and a synchronization process (after_completion) is requested to synchronization objects, which are registered in the coordinator. By the request, the state object delete unit (SDU) in the state object delete adapter (SDA) deletes a transaction state manager and objects, which are managed by the transaction state manager. Therefore, the present invention can provide a way of repeatedly performing, the transaction by eliminating accumulated state objects excessively stored in the memory.

The method of the present invention can be implemented as a program and can be stored in a computer readable record medium including a CD-ROM, a RAM, a floppy disk, a hard disk and an optical disk.

While the present invention has been described with respect to certain preferred embodiments, it will be apparent to those skilled in the art that various changes and modifications may be made without departing from the scope of the invention as defined in the following claims.

What is claimed is:

1. A computer readable record medium for executing a method of deleting state objects, comprising functions of:
   a) allowing a java transaction service unit to include a state object delete unit and a state object delete adapter when a transaction manager of the java transaction service generates a transaction state manager object and registering the state object delete adapter in which the state object delete unit is registered, to a coordinator of an object transaction service unit as a synchronization object;
   b) requesting an after_completion process, which is a synchronization process after completing a transaction, to synchronization objects registered after the coordinator completes a process of a commit protocol at completing the transaction, and driving the state object delete adapter for invoking the synchronization object to perform the after_completion process; and
   c) driving the state object delete unit invoked by the stat object delete adapter and deleting a transaction state manager registered to the transaction manager of the java transaction service unit and objects which are managed by the transaction state manager.

2. A method for eliminating state objects of a java transaction service by using an object transaction service coordinator, comprising the steps of:
   a) allowing a java transaction service unit to include a state object delete unit and a state object delete adapter when a transaction manager of the java transaction service generates a transaction state manager object and registering the state object delete adapter in which the state object delete unit is registered, to a coordinator of an object transaction service unit as a synchronization object;
   b) requesting an after_completion process, which is a synchronization process after completing a transaction, to synchronization objects registered after the coordinator completes a process of a commit protocol at completing the transaction, and driving the state object delete adapter for invoking the synchronization object to perform the after_completion process; and c) driving the state object delete unit invoked by the stat object delete adapter and deleting a transaction state manager registered to the transaction manager of the java transaction service unit and objects which are managed by the transaction state manager.

3. The method as recited in claim 2, wherein said step a) includes the step of registering the state object delete adapter to the coordinator of the object transaction service by registering the state object delete unit in the state object delete adapter when a transaction resource of the java transaction service performs registration of a resource in response to a request from a transaction processing unit.

4. The method as recited in claim 2, wherein said step a) includes the steps of:

a1) when a transaction resource of the java transaction service receives a request to register a resource of the transaction processing unit, determining whether the transaction state manager of the transaction resource is registered in the transaction manager;

a2) generating the transaction state manager, and registering the transaction state manager to the transaction manager if the transaction state manager is not registered to the transaction manager;

a3) at the transaction manager, generating the state object delete unit, storing a reference of an object of the transaction state manager to the state object delete unit and requesting to register the state object delete unit to the transaction state manager of the transaction resource;

a4) determining whether the transaction state manager of the transaction resource is registered to the state object delete adapter; and a5) at the transaction state manager, generating the state object delete adapter, registering the state object delete adapter to the transaction state manager, registering the reference of the object of the state object delete unit to the state object delete adapter and registering the state object delete adapter to the coordinator of the object transaction service.

5. The method as recited in claim 2, wherein said step b) includes the step of, at coordinator, requesting the after_completion process to the state object delete adapter after completing a transaction of the transaction processing unit.

6. The method as recited in claim 5, wherein said step c) includes the steps of:

c1) invoking the state object delete unit to perform the after_completion process after the state object delete adapter of the java transaction service receives a request for the after_completion process;

c2) at the state object delete unit, invoking the transaction state manager to eliminate an object;

c3) eliminating the objects, which are managed by the transaction state manager and invoking the transaction manager to eliminate the transaction state manager registered to the transaction manager; and c4) at the transaction manager, eliminating the transaction state manager.

* * * * *